US006782271B2

(12) United States Patent
Huh et al.

(10) Patent No.: US 6,782,271 B2
(45) Date of Patent: Aug. 24, 2004

(54) METHOD AND APPARATUS FOR LINK ADAPTATION IN A MOBILE COMMUNICATION SYSTEM

(75) Inventors: Hoon Huh, Daejeon-Kwangyok-shi (KR); Yu-Suk Yun, Seoul (KR); Soon-Young Yoon, Seoul (KR); Jae-Heung Yeom, Seoul (KR); Sang-Hyun Yang, Seoul (KR); Hee-Won Kang, Songnam-shi (KR)

(73) Assignee: Samsung Electronics Co., LTD (KR)

( * ) Notice: Subject to any disclaimer, the term of this patent is extended or adjusted under 35 U.S.C. 154(b) by 9 days.

(21) Appl. No.: 09/892,803

(22) Filed: Jun. 27, 2001

(65) Prior Publication Data

US 2002/0036994 A1 Mar. 28, 2002

(30) Foreign Application Priority Data

Jun. 27, 2000 (KR) ........................................ 2000-35792

(51) Int. Cl.$^7$ .............................. H04B 7/00; H04Q 7/20
(52) U.S. Cl. ...................... 455/522; 455/523; 455/524; 455/525; 370/318; 370/328
(58) Field of Search ................................ 455/522, 523, 455/524, 525; 370/318, 328

(56) References Cited

U.S. PATENT DOCUMENTS

| | | | | |
|---|---|---|---|---|
| 5,491,837 A | * | 2/1996 | Haartsen ..................... | 370/337 |
| 5,812,938 A | * | 9/1998 | Gilhousen et al. .......... | 455/517 |
| 5,850,605 A | * | 12/1998 | Souissi et al. .............. | 370/313 |
| 5,857,147 A | * | 1/1999 | Gardner et al. ............. | 370/236 |
| 5,930,242 A | * | 7/1999 | Mimura ...................... | 370/331 |
| 5,956,642 A | * | 9/1999 | Larsson et al. ............. | 455/449 |
| 5,991,329 A | * | 11/1999 | Lomp et al. ................ | 375/130 |
| 6,253,063 B1 | * | 6/2001 | Cudak et al. ............... | 370/468 |
| 6,272,124 B1 | * | 8/2001 | Ahn et al. ................... | 370/342 |
| 6,360,080 B1 | * | 3/2002 | Yun et al. ................... | 455/103 |
| 6,385,462 B1 | * | 5/2002 | Baum et al. ................ | 455/522 |
| 6,556,549 B1 | * | 4/2003 | Bender et al. .............. | 370/328 |

FOREIGN PATENT DOCUMENTS

| | | |
|---|---|---|
| CN | 1192304 A | 9/1998 |
| EP | 0 986 282 | 3/2000 |

OTHER PUBLICATIONS

Chinese Office Action dated Aug. 1, 2003 issued in a counterpart application, namely, Appln. No. 01802248.0.

* cited by examiner

Primary Examiner—William Trost
Assistant Examiner—Stephen D'Agosta
(74) Attorney, Agent, or Firm—Dilworth & Barrese, LLP

(57) ABSTRACT

Disclosed is a method for determining a forward data rate and a forward transmission power level in a mobile communication system. An access terminal measures a C/I of a forward pilot channel, determines a forward data rate by matching the measured C/I with a reference C/I, creates a difference between the measured C/I and the reference C/I as margin information, and transmits the determined forward data rate and margin information over a reverse transmission channel. Upon receipt of the forward data rate and margin information, an access network decreases a transmission power level by power corresponding to the margin information and performs forward transmission at the forward data rate at the decreased transmission power level.

30 Claims, 10 Drawing Sheets

METHOD AND APPARATUS FOR LINK ADAPTATION IN A MOBILE COMMUNICATION SYSTEM

PRIORITY

This application claims priority to an application entitled "Method and Apparatus for Link Adaptation in a Mobile Communication System" filed in the Korean Industrial Property Office on Jun. 27, 2000 and assigned Serial No. 2000-35792, the contents of which are hereby incorporated by reference.

BACKGROUND OF THE INVENTION

1. Field of the Invention

The present invention relates generally to a mobile communication system, and in particular, to a link adaptation apparatus and method in a CDMA (Code Division Multiple Access) mobile communication system.

2. Description of the Related Art

In a mobile communication system using radio channels, an attenuation of a radio signal varies depending on a distance between an access network (AN) and an access terminal (AT), and shadowing. Further, the radio channels used in the mobile communication system experience considerable interference between signals, and fading. Therefore, a carrier-to-interference ratio (hereinafter, referred to as "C/I" for short) is subjected to severe variations depending on the condition of the radio channels. A link adaptation technique has been proposed to increase throughput of a channel by adjusting a data rate according to the channel condition (or C/I). The data rate is determined depending on a coding rate and a modulation mode. When the C/I is high, a higher coding rate and a high-level modulation mode are used to increase the data rate. On the contrary, however, when the C/I is low, a lower coding rate and a low-level modulation mode are used to increase reliability of the channel.

In order to transmit data while maintaining the channel reliability according to the C/I, a receiver and a transmitter in the mobile communication system operate as follows. The receiver predicts a variation of the next channel based on the C/I to determine a data rate, and then, transmits the determined data rate information to the transmitter. The transmitter then assigns a data rate according to the data rate requested by the receiver and maintains a transmission power level constantly to a reference level.

Measurement of the C/I and assignment of the data rate will be described below with reference to an HDR (High Data Rate) forward link proposed in 3GPP2 ($3^{rd}$ Generation Partnership Project 2), by way of example. In the foregoing description, the transmitter corresponds to an access network (AN), while the receiver corresponds to an access terminal (AT). The HDR physical layer based on the link adaptation technique supports 13 transmission modes, which are determined by a combination of three modulation modes of QPSK (Quadrature Phase Shift Keying), 8 PSK (8-ary Phase Shift Keying) and 16 QAM (16-ary Phase Shift Keying), three coding rates of ¼, ⅜ and ½, and the number of slots where a packet is repeated. The transmission power level of HDR system is the maximum transmission power level.

FIG. 1 illustrates a transmission/reception timing diagram of forward and reverse links in an HDR system. Referring to FIG. 1, the forward and reverse packets each include 2048 chips per slot. Further, each slot includes one pilot channel per half slot (½ slot), and each pilot channel includes 96 chips. Such a pilot channel is usually transmitted at the same power as that of a traffic channel. Therefore, the HDR system estimates a C/I of the traffic channel by measuring a C/I of the pilot channel. That is, the receiver measures a C/I value of the pilot channel and determines a data rate depending on the measured C/I value. The receiver transmits the determined data rate information to the transmitter. In the HDR specification, the data rate information transmitted to the transmitter is referred to as "DRC (Data Rate Control)." The DRC is transmitted over a DRC channel, and represented by a 4-bit DRC symbol.

FIG. 2 illustrates puncturing patterns of a pilot channel, a DRC channel and an RRI (Reverse Rate Indicator) channel for the reverse link of the HDR system. Here, the RRI channel is used to transmit data rate information of a reverse traffic channel. With reference to FIG. 2, a description will be made herein below of a structure of each channel for the reverse link.

First, a process for constructing a DRC symbol transmitted over the DRC channel will be described. The DRC symbol transmitted over the DRC channel is block-encoded with each code of (8,4,4) bi-orthogonal code on a one-to-one basis according to a data rate. Thereafter, the access terminal repeats an 8-bit DRC symbol transmitted over the reverse link, once every bit. Further, the access terminal spreads the repeated DRC symbol with an 8-bit Walsh code indicating a sector to which the access terminal belongs. The spread DRC symbol is spread again with a 4-bit Walsh code, constructing a DRC symbol comprised of a total of 512 chips. The 512-chip DRC symbol is repeated once again, so that each slot includes 1024 chips assigned to the DRC channel. The DRC chips are divided into 16 64-chip TDM (Time Division Multiplex) slots, and transmitted together with the pilot and RRI channels on a TDM basis, as shown in FIG. 2. That is, the DRC chips are alternately inserted starting from the first TDM slot. An RRI symbol is inserted once in the second TDM slot of a 2048-chip slot. Further, pilot symbols are inserted in the TDM slots into which the DRC symbols are not inserted, thereby constructing one slot.

Now, a description will be made regarding a process of determining a data rate depending on a C/I of the forward channel and a process of transmitting the DRC over the reverse channel in the HDR system employing the link adaptation technique.

The HDR system supports several predefined data rates, and each data rate has a unique coding rate and a unique modulation mode. Further, the receiver includes a C/I table for storing a C/I threshold satisfying a specific packet error probability at every data rate. Therefore, the receiver measures a C/I value of the pilot channel among the forward channels, and compares the measured C/I value with the C/I thresholds stored in the C/I table. The receiver searches the largest one of the C/I thresholds that is smaller than the measured C/I value, and determines a corresponding data rate as an acceptable data rate. The receiver transmits the determined data rate information to the transmitter over the DRC channel out of the reverse channels.

There exists an interval between the adjacent C/I thresholds stored in the C/I table. Therefore, even though a C/I threshold closest to the C/I value is selected, there exists a difference between them. This difference becomes surplus transmission power on the C/I and the packet error probability. Therefore, transmitting a transmission channel at a data rate associated with the selected C/I threshold causes an unnecessary waste of transmission power.

Table 1 below illustrates a C/I table in which C/I thresholds are stored, by way of example. When the measured C/I value is −13 dB, the receiver selects a C/I threshold of −15 dB in accordance with Table 1. In this case, there exists a difference of 2 dB between the measured C/I value and the selected C/I threshold.

TABLE 1

| Data Rate | C/I Threshold |
| --- | --- |
| 38.4 Kbps | −15 dB |
| 76.8 Kbps | −12 dB |
| . . . | . . . |
| 2.4 Mbps | +9 dB |

The C/I thresholds given in Table 1 satisfy a receiving error rate at each data rate. Therefore, the receiving error rate is duly satisfied even for the C/I value of −15 dB. However, when the C/I value is −13 dB, there occurs surplus power of −2 dB, causing an unnecessary waste of power during data transmission. In addition, the surplus power causes interference between channels and a waste of bandwidth.

In conclusion, since the HDR system employing the link adaptation technique determines a data rate by comparing the C/I value with predetermined C/I thresholds, there occurs a difference between the actual C/I value measured and the C/I threshold that becomes a criterion for determining the data rate. The difference causes an unnecessary waste of power at the transmitter, increases interference between channels in the radio environment, and causes a waste of bandwidth.

SUMMARY OF THE INVENTION

It is, therefore, an object of the present invention to provide an apparatus and method for reducing surplus transmission power in a mobile communication system employing link adaptation.

It is another object of the present invention to provide an apparatus and method for indicating a data rate and a transmission power level in a mobile communication system employing link adaptation.

It is further another object of the present invention to provide an apparatus and method for transmitting a C/I value of a forward channel to a transmitter in a mobile communication system employing link adaptation.

According to one aspect of the present invention, there is provided a method for determining a forward data rate and a forward transmission power level in a mobile communication system. An access terminal measures a C/I of a forward pilot channel, determines a forward data rate by matching the measured C/I with a reference C/I, creates a difference between the measured C/I and the reference C/I as margin information, and transmits the determined forward data rate and margin information over a reverse transmission channel. Upon receipt of the forward data rate and margin information, an access network decreases a transmission power level by power corresponding to the margin information and performs forward transmission at the forward data rate at the decreased transmission power level.

According to another aspect of the present invention, there is provided a method for determining a forward data rate and a forward transmission power level in a mobile communication system. An access terminal measures a C/I of a forward pilot channel, and transmits the measured C/I over a reverse data rate channel. Upon receipt of the C/I received over a reverse link, an access network determines a forward data rate by matching the measured C/I with a reference C/I associated with a data rate of packet data, determines margin information for determining a forward transmission power level by calculating a difference between the received C/I and the reference C/I when the received C/I is not identical to the reference C/I, creates transmission data associated with the determined data rate, decreases the transmission power level associated with the data rate using the calculated margin information, and transmits the transmission data at the decreased transmission power level.

According to further another aspect of the present invention, there is provided a transmission apparatus for a mobile communication system, for determining a data rate using a C/I and transmitting a forward data rate and a transmission power level over a reverse transmission channel using margin information determined based on a difference between a reference C/I and the C/I. The apparatus comprises: a first multiplexer for time-division-multiplexing the data rate and the margin information; an encoder for encoding an output of the first multiplexer; a spreader for spreading the encoded data rate and margin information; and a second multiplexer for time-division-multiplexing a reverse pilot channel and an RRI (Reverse Rate Indicator) channel to an output of the spreader.

According to yet another aspect of the present invention, there is provided a transmission apparatus for transmitting a C/I in a mobile communication system. The apparatus comprises: an encoder for encoding a measured C/I; a spreader for spreading an output of the encoder; and a multiplexer for time-division-multiplexing an output of the spreader, a reverse pilot channel and an RRI channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the term "forward link" is defined as a radio link formed in a direction from an access network AN to an access terminal AT, while the term "reverse link" is defined as a radio link formed in a direction from the access terminal AT to the access network AN. In addition, the term "DRC (Data Rate Control)" is defined as information on a data rate requested by a receiver.

Figure 3:
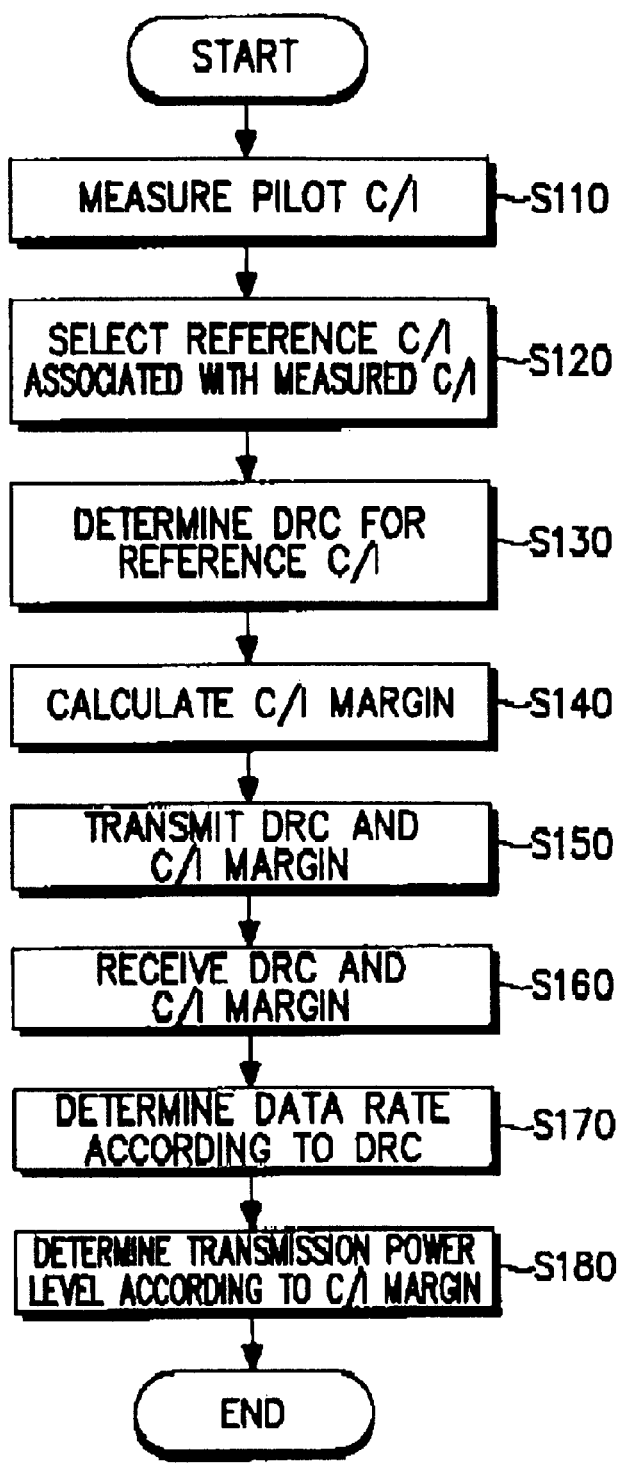
FIG. 3 illustrates a procedure for determining a forward data rate and a transmission power level based on DRC and C/I margin according to a first embodiment of the present invention.

FIG. 3 illustrates a procedure for determining a forward data rate and a transmission power level based on DRC and C/I margin according to a first embodiment of the present invention. Referring to FIG. 3, an access terminal AT measures a C/I value of a forward pilot channel in step S110. Thereafter, in step S120, the access terminal AT searches the C/I table of Table 1 for the largest one of the C/I thresholds that is smaller than the measured C/I value, and defines the selected C/I threshold as a reference C/I. Here, the "reference C/I" refers to a C/I threshold selected, based on the measured C/I value, from the C/I thresholds previously stored in the C/I table. After selecting the reference C/I value in step S120, the access terminal AT defines a data rate associated with the reference C/I value in the C/I table as an acceptable data rate and then, constructs the determined data rate into a 4-bit DRC symbol, in step S130.

In step S140, the access terminal AT calculates the difference between the measured C/I value and the reference C/I value. The calculated difference value becomes a margin value. Since the largest one of the C/I thresholds that is smaller than the measured C/I value is selected from the C/I table, the difference obtained by subtracting the reference C/I value from the measured C/I value always has a positive value. Further, in step S140, the access terminal AT converts the calculated margin value into margin information comprised of a predetermined number of data bits. For example, if the margin information is divided into 16 levels, it can be comprised of 4 data bits. That is, the access terminal AT creates a 4-bit margin symbol using the calculated margin information. In step S150, the access terminal AT encodes the DRC symbol and the margin symbol, and transmits the encoded symbols to an access network AN.

The DRC symbol and the margin symbol are transmitted from the access terminal AT to the access network AN through a radio link. Then, in step S160, the access network AN decodes the received DRC and margin symbols. The decoded DRC symbol is provided to a scheduler included in the access network AN, while the decoded margin symbol is provided to a transmission amplifier included in the access network AN. Then, in step S170, the access network AN determines an access terminal to be assigned a traffic channel of the next slot and also determines a data rate of the determined access terminal, based on the DRC symbol. In step S180, the transmission amplifier of the access network AN defines as a power level a value determined by decreasing the transmission power level by the power level calculated from the margin symbol. Therefore, the forward traffic channel transmits its traffic data at the transmission power level set according to the data rate, reduced by the transmission power level according to the margin symbol. Unlike the traffic channel, the forward pilot channel and a forward MAC (Media Access Control) channel are transmitted at a constant transmission power level regardless of the data rate or the margin. The access terminal AT measures the C/I value not depending on the transmission power level updated according to the margin symbol but depending on the constant transmission power level.

Figure 1:
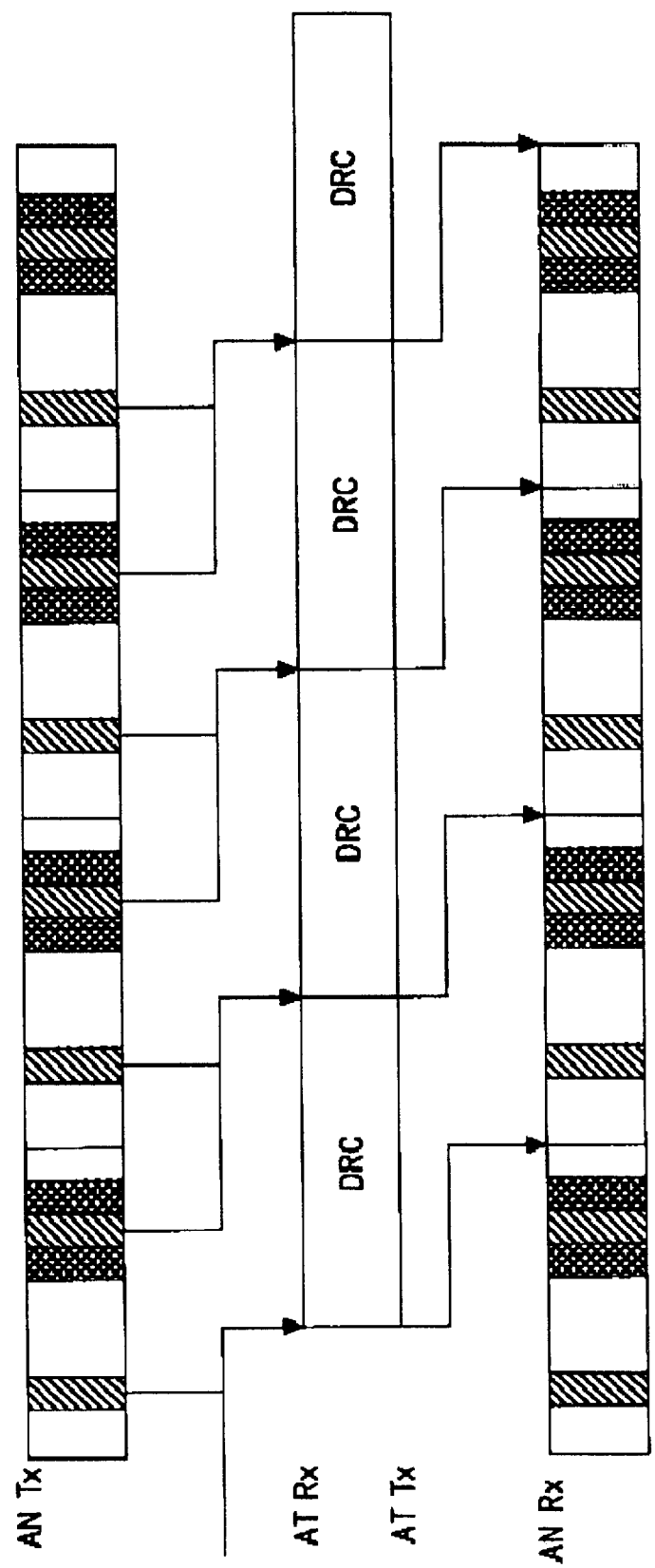
FIG. 1 illustrates a transmission/reception timing diagram of forward and reverse links in an HDR system.
Figure 2:
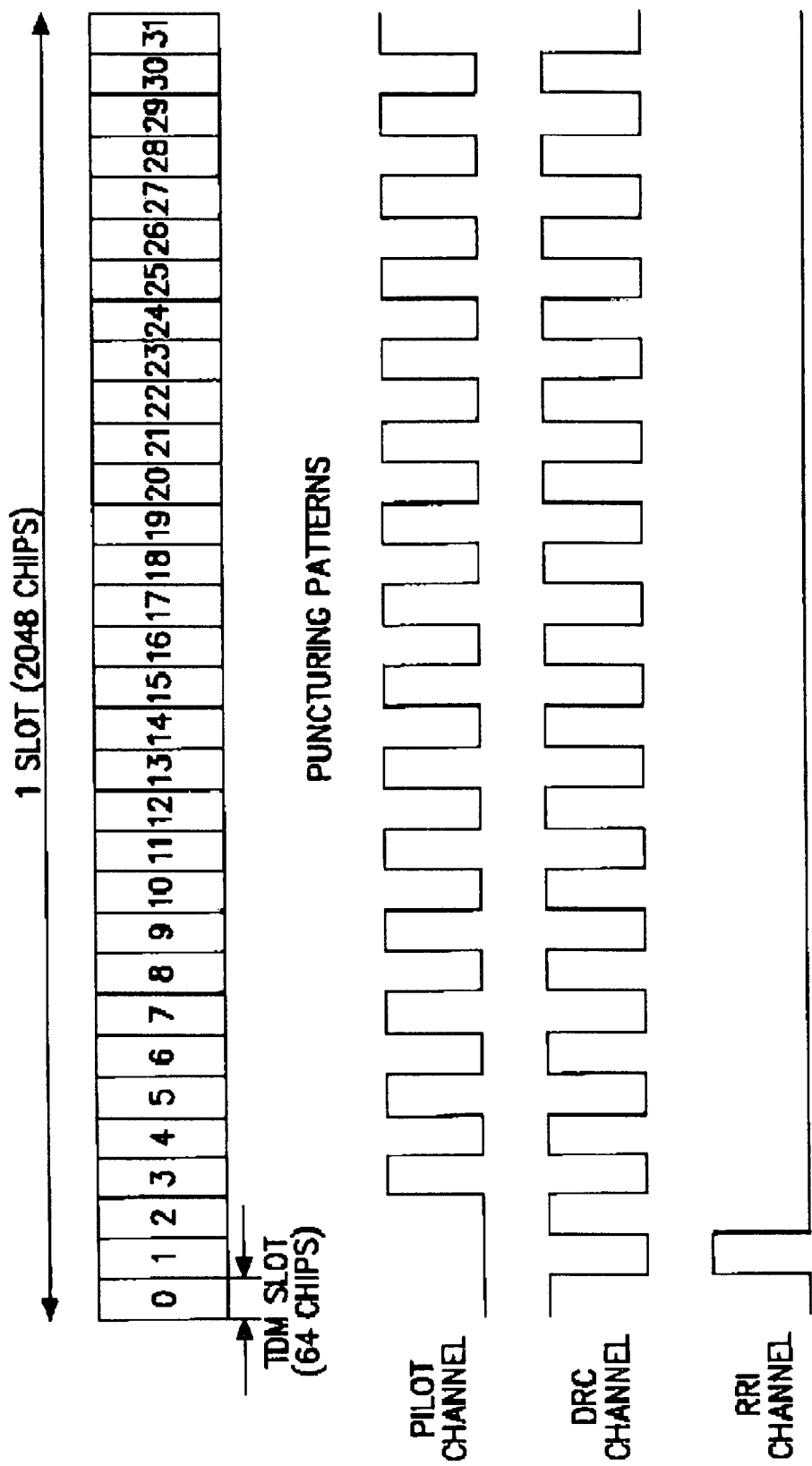
FIG. 2 illustrates puncturing patterns of a pilot channel, a DRC channel and an RRI channel for a reverse link in the HDR system.

In the first embodiment of the present invention, the access terminal AT transmits the DRC symbol and the margin symbol to the access network AN through the DRC channel of the HDR reverse link, as described with reference to FIG. 2.

Figure 4A:
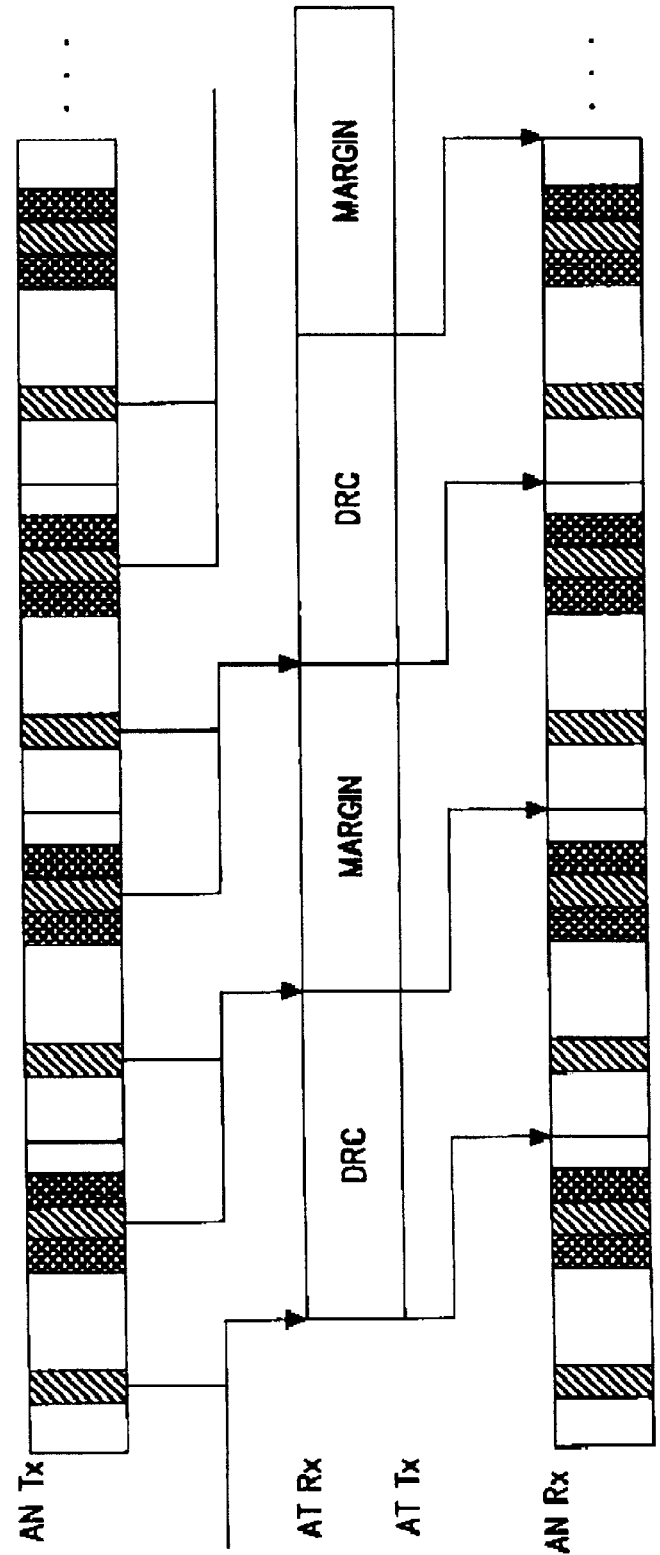
FIG. 4A illustrates a slot transmission/reception timing diagram of forward and reverse links, wherein a DRC symbol and a C/I margin symbol are transmitted over two slots according to the first embodiment of the present invention.
Figure 4B:
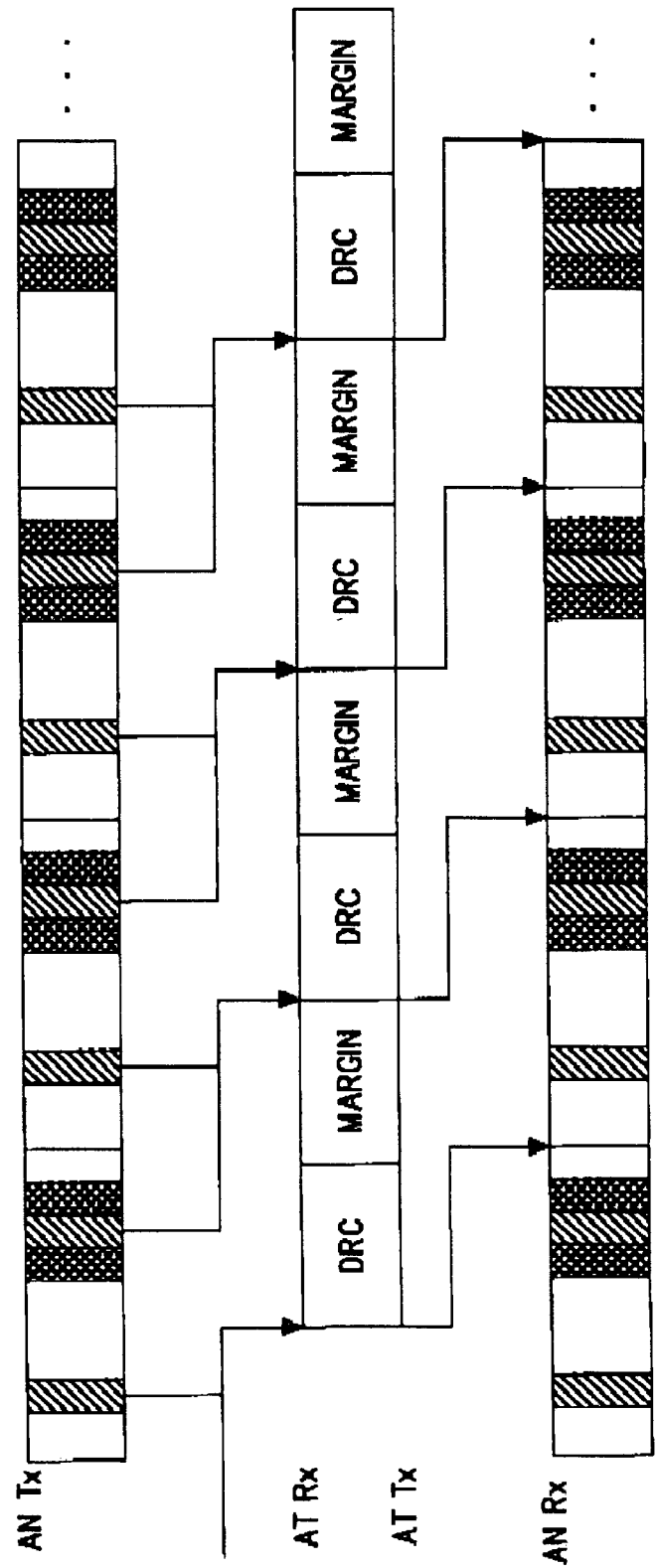
FIG. 4B illustrates a slot transmission/reception timing diagram of forward and reverse links, wherein a DRC symbol and a C/I margin symbol are transmitted over one slot according to the first embodiment of the present invention.

With reference to FIGS. 4A and 4B, a description will be made of two proposed methods for transmitting the DRC and margin symbols. FIG. 4A illustrates a slot transmission/reception timing diagram of forward and reverse links, wherein a DRC symbol and a C/I margin symbol are transmitted over two slots according to the first embodiment of the present invention. FIG. 4B illustrates a slot transmission/reception timing diagram of forward and reverse links, wherein a DRC symbol and a C/I margin symbol are transmitted over one slot according to the first embodiment of the present invention.

In FIG. 4A, a DRC symbol and a C/I margin symbol are alternately transmitted over 2 slots through a DRC channel of the HDR reverse link. That is, after measuring the C/I value of the pilot channel of the HDR forward link AN_Tx and determining a 4-bit DRC symbol and a 4-bit C/I margin symbol accordingly, the HDR reverse link AT_Tx transmits the 4-bit DRC symbol in the odd-numbered slot duration among the 32 slots constituting one packet, and transmits the 4-bit C/I margin symbol corresponding to the just-transmitted DRC symbol in the even-numbered slot duration.

The access network AN receives the DRC symbol and the margin symbol in a unit of two slots, and then, determines a data rate to be applied to the next slot of the forward link and a transmission power level of the traffic channel. Therefore, in the example of FIG. 4A, scheduling in the forward link is performed in a unit of two slots, and the C/I value is also determined using a C/I value of a received pilot channel of two slots.

In FIG. 4B, the DRC symbol and the C/I margin symbol are transmitted over one slot through the DRC channel of the HDR reverse link. A general DRC symbol is repeated once within one slot after spreading. However, the reverse link AT_Tx according to the present invention alternately transmits the 4-bit DRC symbol and the 4-bit margin symbol in a unit of half slot, instead of repeating the 4-bit DRC symbol. That is, the 4-bit DRC symbol is transmitted in the first half duration of one slot, while the 4-bit margin symbol is transmitted in the second half duration. In the example of FIG. 4B, scheduling is performed in a unit of one slot, but the transmission power level of the reverse link must be doubled in order to maintain the error probability of the method shown in FIG. 4A.

Figure 5:
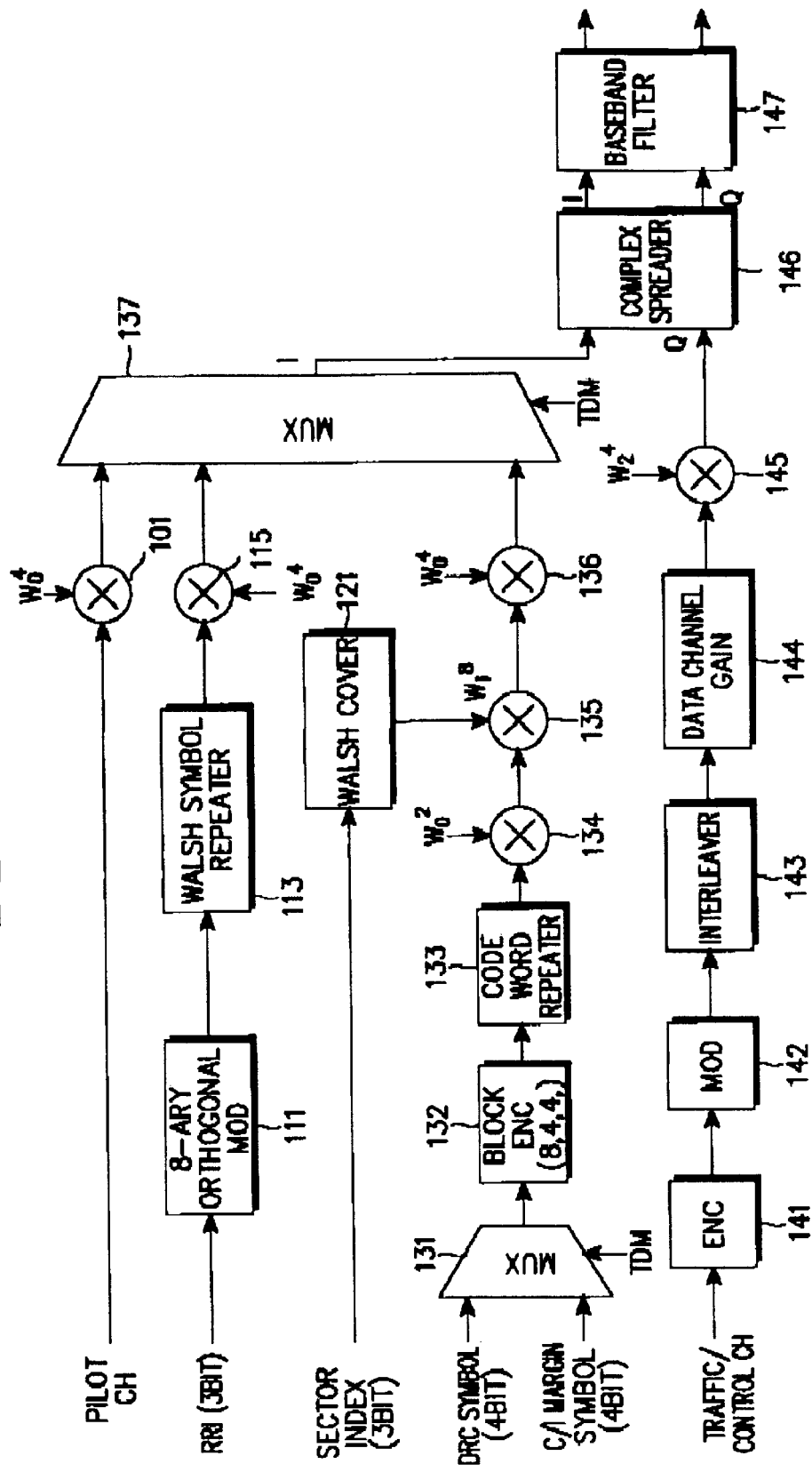
FIG. 5 illustrates a structure of an access terminal transmitter for transmitting a DRC symbol and a margin symbol in the method as illustrated in FIG. 4A.

FIG. 5 illustrates a structure of an access terminal transmitter for transmitting the DRC symbol and the margin symbol as described in the method of FIG. 4A. Referring to FIG. 5, a first multiplexer (MUX) 131 outputs the 4-bit DRC symbol in the odd-numbered slot duration, and outputs the 4-bit margin symbol in the even-numbered slot duration. The DRC symbol or the margin symbol output from the first multiplexer 131 is subjected to (8,4,4) bi-orthogonal coding by a block encoder 132, and then, repeated once by a repeater 133. The output signals of the repeater 133 are primarily spread with a Walsh code $W_0^2$ of length 2 by a first spreader 134, and then, secondarily spread by a second spreader 135 with a Walsh code $W_i^8$ selected by 3-bit index information 'i' of the sector to which the access terminal belongs. Further, the secondarily spread signals are finally spread with a Walsh code $W_0^4$ of length 4 by a third spreader 136. That is, the signals output from the block encoder 132 are subjected to spreading three times.

Meanwhile, a pilot channel is spread with a Walsh code $W_0^4$ of length 4 by a pilot spreader 101. Further, 3-bit RRI information is orthogonally modulated by an orthogonal modulator 111, and repeated by a Walsh symbol repeater 113. Thereafter, the output signal of the Walsh symbol repeater 113 is spread with a Walsh code $W_0^4$ of length 4 by an RRI spreader 115.

A second multiplexer 137 multiplexes the spread pilot channel, the spread RRI channel and the spread DRC or margin symbol on a TDM basis. A complex spreader 146 performs complex spreading on the output of the second multiplexer 137 and the traffic/control channel signals spread with a Walsh code $W_2^4$ of length 4 by a traffic channel spreader 145. The complex spread signal is baseband-filtered by a baseband filter 147, and then, transmitted to the access network AN.

When the structure of FIG. 5 is applied to FIG. 4B, the 4-bit DRC symbol and the 4-bit margin symbol are spread without repetition after being subjected to bi-orthogonal coding. That is, the transmitter is not required to include the repeater 133 in transmitting the DRC symbol and the margin symbol.

Figure 6:
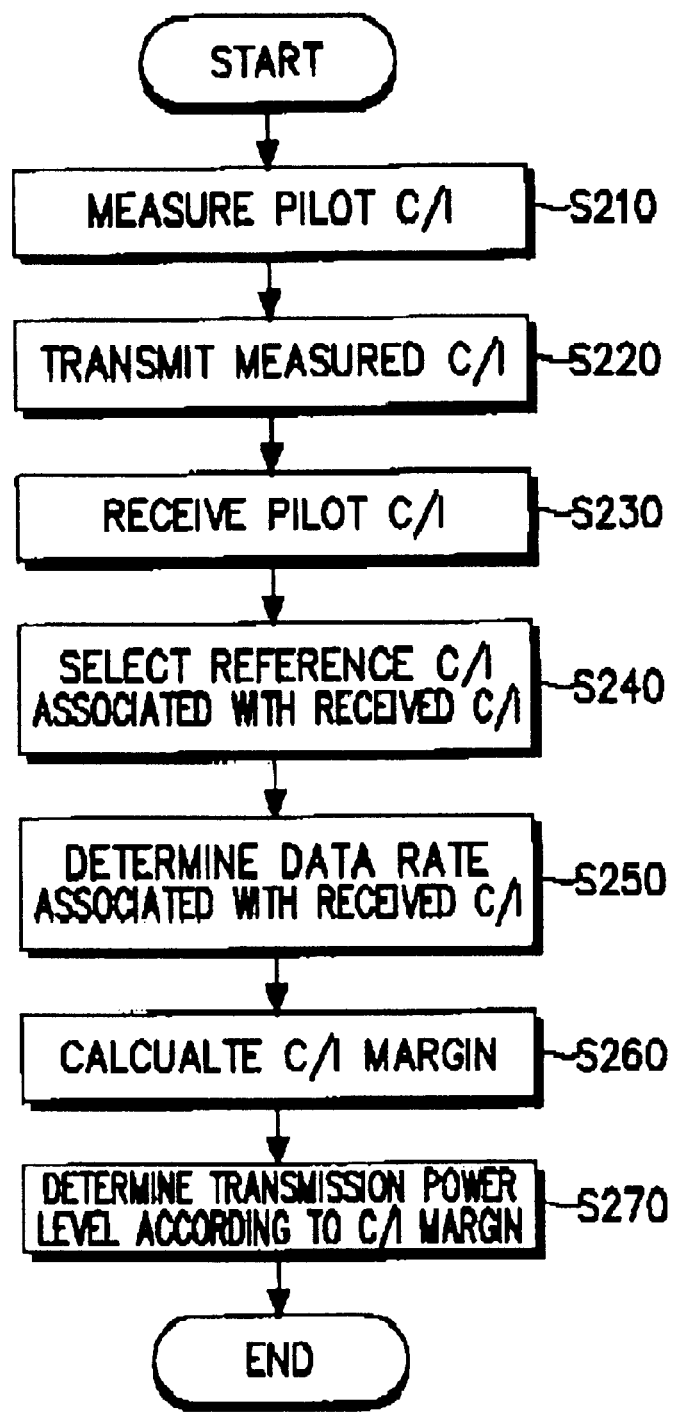
FIG. 6 illustrates a procedure for determining a forward data rate and a transmission power level based on a C/I value according to a second embodiment of the present invention.

FIG. 6 illustrates a procedure for determining a forward data rate and a transmission power level based on a C/I value according to a second embodiment of the present invention. Referring to FIG. 6, an access terminal AT measures a C/I value of a forward pilot channel in step S210. Thereafter, in step S220, the access terminal AT constructs the measured C/I value into an 8-bit C/I symbol, encodes the constructed symbol, and then transmits the encoded symbol to an access network AN. That is, the access terminal AT creates the measured C/I value into an 8-bit symbol instead of the 4-bit DRC information as in the prior art and the first embodiment of the present invention.

In step S230, the access network AN receives the C/I symbol and decodes the received C/I symbol. Thereafter, in step S240, the access network AN searches the C/I table for the largest one of the C/I thresholds that is smaller than the received C/I value, and defines this value as a reference C/I value. After determining the reference C/I value, the access network AN selects a data rate corresponding to the reference C/I value from the C/I table and provides the selected data rate to a scheduler included therein, in step S250. The scheduler in the access network AN then defines the selected data rate as a data rate of the traffic channel in the next slot of the corresponding access terminal AT.

Thereafter, in step S260, the access network AN calculates a margin of the C/I value against the reference C/I value. The margin is equal to a value determined by subtracting the reference C/I value from the C/I value, as in the first embodiment. In step S270, the access network AN defines as a transmission power level a value determined by decreasing the transmission power level by a power level calculated according to the margin. After determining the power level, the access network AN provides the transmission power level value to the transmission amplifier included therein and uses it as a transmission power level of the traffic channel in the next slot of the corresponding access terminal. Therefore, the forward traffic channel is transmitted at the determined transmission power level. Meanwhile, the forward pilot channel and the forward MAC channel are transmitted at the constant power level regardless of the data rate or the margin, as in the first embodiment.

In the second embodiment of the present invention, since the access network AN determines the data rate by searching the C/I table, the access terminal AT is not required to transmit the DRC to the access network AN. Instead, the access terminal AT should transmit the measured C/I value to the access network AN. However, since the C/I value needs more bits as compared with the DRC symbol, another method for transmitting the C/I value over the DRC channel of the HDR reverse link is required.

Figure 7A:
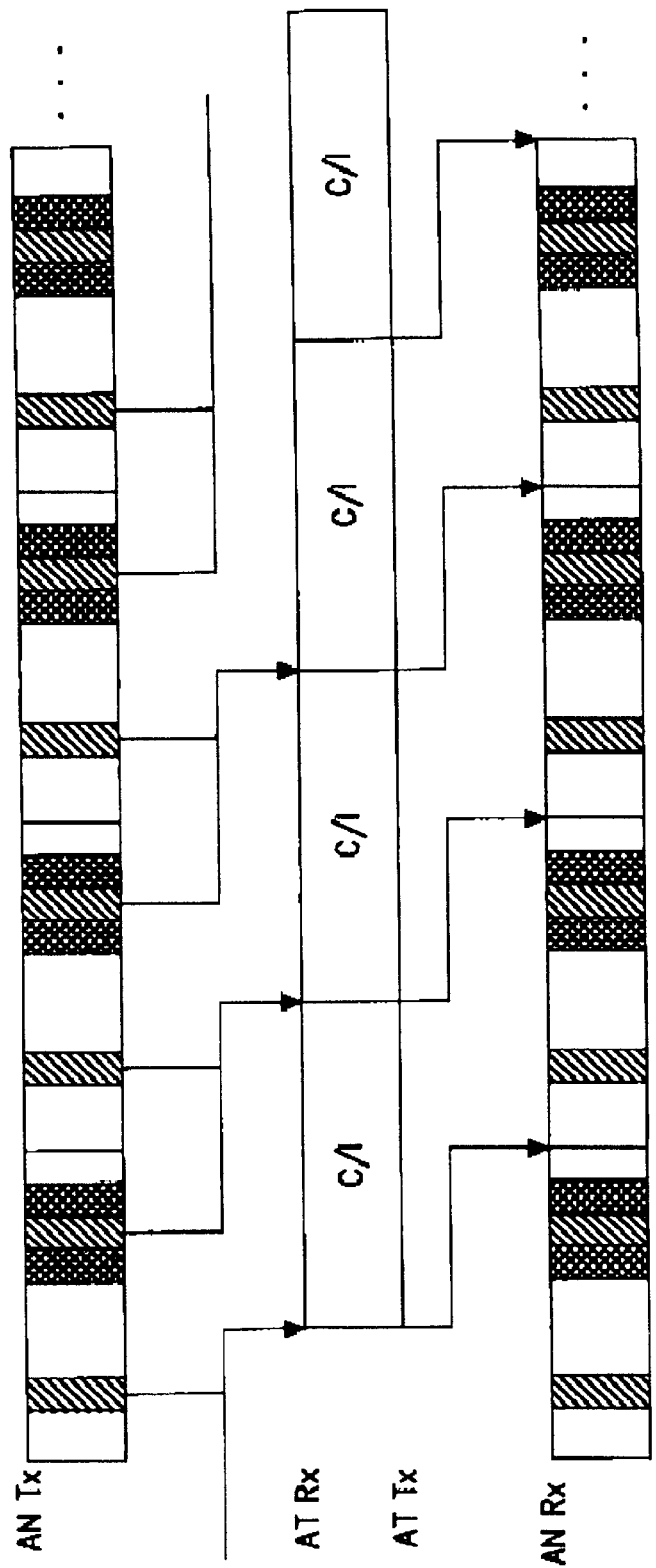
FIG. 7A illustrates a slot transmission/reception timing diagram of forward and reverse links, wherein an 8-bit C/I symbol is transmitted over one slot according to the second embodiment of the present invention.

There are two proposed methods for transmitting the C/I symbol over the DRC channel of the HDR reverse link according to the second embodiment of the present invention. FIG. 7A illustrates the first method for transmitting the C/I symbol over the DRC channel of the reverse link according to the second embodiment of the present invention, while FIG. 7B illustrates the second method.

FIG. 7A illustrates a slot transmission/reception timing diagram of forward and reverse links, wherein an 8-bit C/I symbol is transmitted over one slot according to the second embodiment of the present invention. With reference to FIG. 7A, the timing of transmitting the C/I symbol over the DRC channel of the reverse link according to the present invention will be described below.

In the prior art described above, the DRC symbol applied to the HDR system is comprised of 4 bits and is repeated once before transmission. In the second embodiment of the present invention, however, the leading 4 bits and the following 4 bits of the 8-bit C/I symbol are transmitted in a unit of half slot, instead of repeating the 4-bit DRC symbol within one slot. Therefore, the whole 8-bit C/I symbol is transmitted over only one slot. Herein, the leading 4 bits of the C/I symbol are transmitted in the first half-slot duration, while the following 4 bits of the C/I symbol are transmitted in the second half-slot duration. By doing so, the access network AN performs scheduling in a unit of one slot.

Figure 7B:
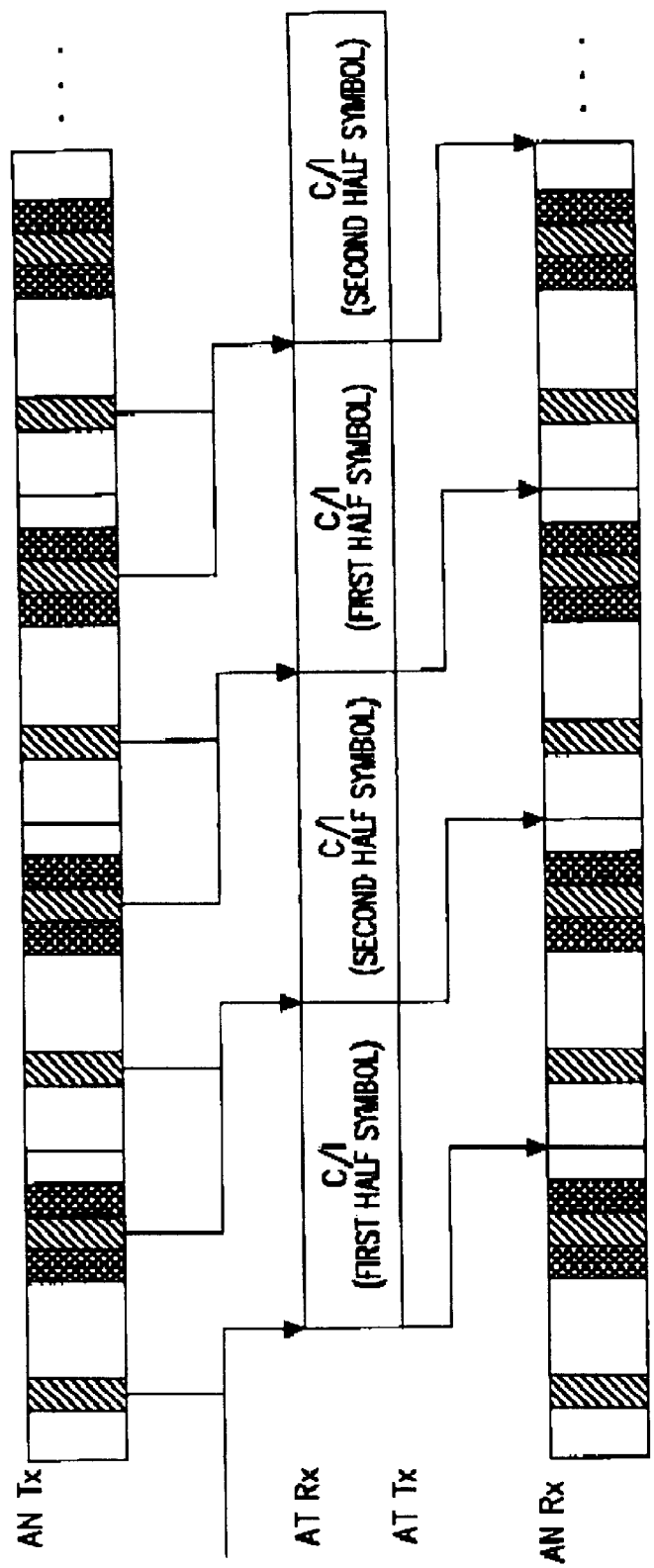
FIG. 7B illustrates a slot transmission/reception timing diagram of forward and reverse links, wherein an 8-bit C/I symbol is transmitted over two slots according to the second embodiment of the present invention.

FIG. 7B illustrates a slot transmission/reception timing diagram of forward and reverse links, wherein an 8-bit C/I symbol is transmitted over two slots according to the second embodiment of the present invention. With reference to FIG. 7B, the timing of transmitting the C/I symbol over the DRC channel of the reverse link according to the present invention will be described below.

The 8-bit C/I symbol is divided into leading 4 bits and following 4 bits, and the leading 4 bits and the following 4 bits are alternately transmitted over two slots in a unit of one slot. Specifically, the leading 4 bits of the C/I symbol are transmitted in the odd-numbered slot durations among the 16 slots constituting one packet, while the following 4 bits of the C/I symbol are transmitted in the even-numbered slot durations. Hence, the method of FIG. 7B requires two slots in transmitting the entire C/I symbol, but can transmit the C/I symbol at the half power compared with the method of FIG. 7A.

Figure 8:
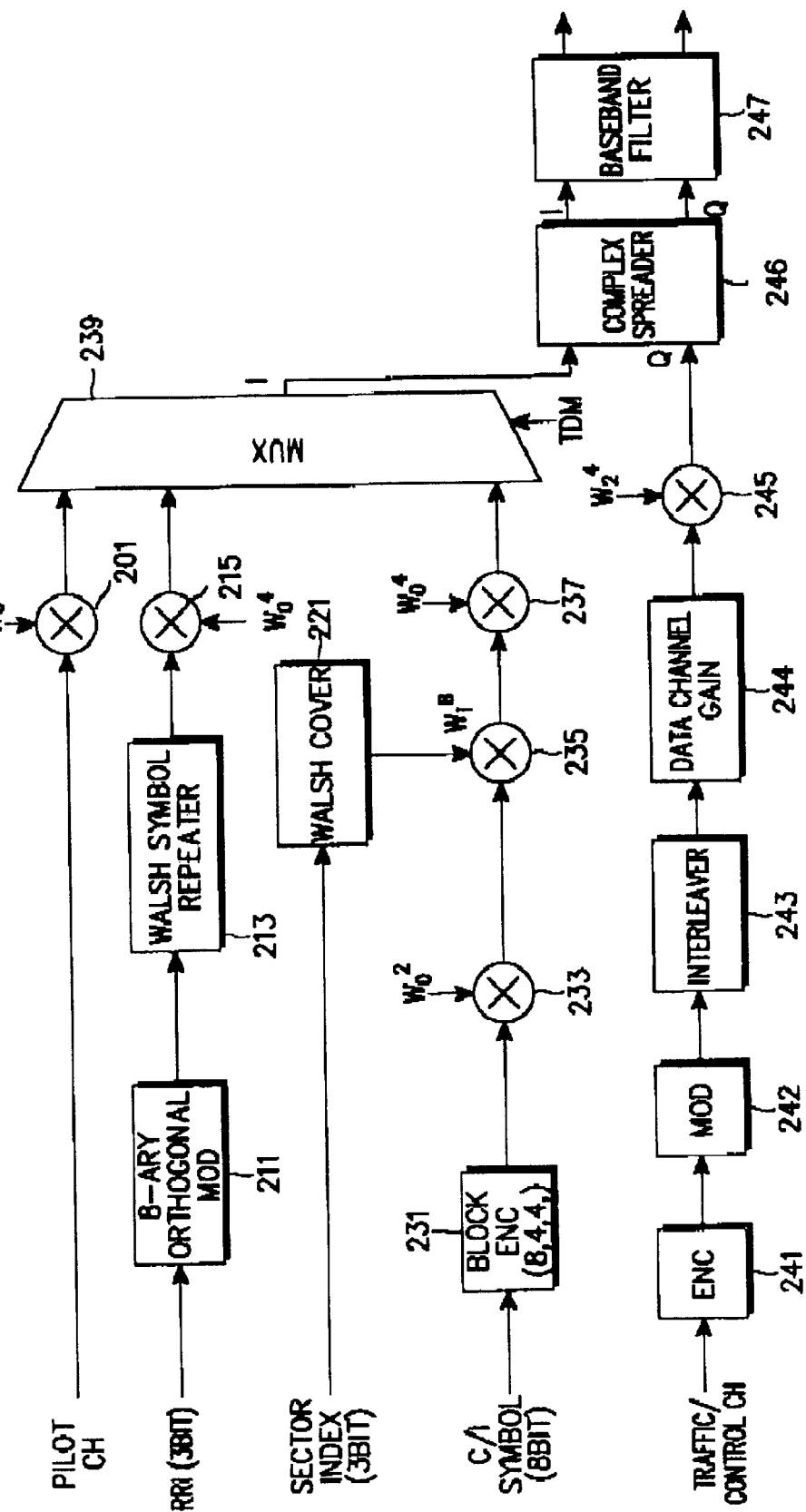
FIG. 8 illustrates a structure of an access terminal transmitter for transmitting a C/I symbol as illustrated in the method of FIG. 7A.

FIG. 8 illustrates a structure of an access terminal transmitter for transmitting the C/I symbol as described in the method of FIG. 7A. Referring to FIG. 8, an 8-bit C/I symbol is subjected to (8,4,4) bi-orthogonal coding by a block encoder 231. The output of the block encoder 231 is spread without repetition. Here, the spreading is performed in three steps. That is, the output of the block encoder 231 undergoes primary spreading with a Walsh code $W_0^2$ of length 2 by a first spreader 233, secondary spreading with a Walsh code $W_i^8$ selected by 3-bit index information 'i' by a second spreader 235, and finally, third spreading with a Walsh code $W_0^4$ of length 4 by a third spreader 237.

Meanwhile, a pilot channel is spread with a Walsh code $W_0^4$ of length 4 by a pilot spreader 201. Further, 3-bit RRI information is orthogonally modulated by an orthogonal modulator 211, and repeated by a Walsh symbol repeater 213. Thereafter, the output signal of the Walsh symbol repeater 213 is spread with a Walsh code $W_0^4$ of length 4 by an RRI spreader 215.

A multiplexer 239 multiplexes the spread pilot channel, the spread RRI channel and the spread C/I symbol on a TDM basis. A complex spreader 246 performs complex spreading on the output of the multiplexer 239 and the traffic/control channel signals spread with a Walsh code $W_2^4$ by a traffic channel spreader 245. The complex spread signal is baseband-filtered by a baseband filter 247, and then, transmitted to the access network AN.

When applied to FIG. 7B, the structure of FIG. 8 is required to have a multiplexer arranged at the front stage of the block encoder 231, and a repeater arranged at the following stage of the block encoder 231. Thus, when transmitting the data as illustrated in the method of FIG. 7B, the multiplexer multiplexes the leading 4 bits and the following 4 bits of the C/I symbol on a TDM basis. Therefore, the leading 4 bits are transmitted in the first half-slot duration, while the following 4 bits are transmitted in the second half-slot duration. In addition, the block-encoded signal output from the block encoder 231 is repeated once by the repeater. Thereafter, the three-step spreading operation is performed in the same manner.

As described above, it is possible to reduce the surplus transmission power by applying the present invention to the mobile communication system employing the link adaptation technique. The reduction in surplus transmission power contributes to decreasing interference to other sectors and other signals, and increasing a forward system capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining a forward data rate and a forward transmission power level in an access terminal of a mobile communication system, comprising the steps of:
measuring a received carrier-to-interference ratio (C/I) of a forward pilot channel and selecting a largest one of C/I thresholds that is smaller than the measured C/I, stored in a C/I table, as a reference C/I;
determining a data rate associated with the selected reference C/I;
determining margin information for determining a forward transmission power level by calculating a difference between the measured C/I and the reference C/I if the measured C/I is not identical to the reference C/I; and
transmitting the determined forward data rate and margin information over a reverse transmission channel;
wherein the step of transmitting the determined forward data rate and margin information comprises the step of transmitting the determined forward data rate for one slot and the margin information for a next one slot over the reverse transmission channel.

2. The method as claimed in claim 1, wherein the step of determining the margin information comprises the steps of:
calculating a difference between the reference C/I and the measured C/I; and
determining margin information by converting the calculated difference into a value comprised of a predetermined number of data bits.

3. The method as claimed in claim 1, wherein the determined forward data rate and the margin information are repeated once before transmission.

4. The method as claimed in claim 1, wherein the C/I is measured for 2 slots of the forward pilot channel.

5. A method for determining a forward data rate and a forward transmission power level in an access terminal of a mobile communication system, comprising the steps of:
measuring a received carrier-to-interference ratio (C/I) of a forward pilot channel and selecting a largest one of C/I thresholds that is smaller than the measured C/I, stored in a C/I table, as a reference C/I;
determining a data rate associated with the selected reference C/I;
determining margin information for determining a forward transmission power level by calculating a difference between the measured C/I and the reference C/I if the measured C/I is not identical to the reference C/I; and
transmitting the determined forward data rate and margin information over a reverse transmission channel, wherein the step of transmitting the determined forward data rate and margin information comprises the step of transmitting the determined forward data rate and the margin information for one slot over the reverse transmission channel.

6. A method for determining a forward data rate and a forward transmission power level in an access network of a mobile communication system, comprising the steps of:
receiving the forward data rate and margin information over a reverse link;
creating data to be transmitted at the received data rate and
decreasing the transmission power level using the received margin information and transmitting the data at the decreased transmission power level;
wherein when the forward data rate and the margin information are received over two slots, scheduling of the forward data rate and determination of the transmission power level are performed in a unit of two slots.

7. The method as claimed in claim 6, wherein a forward pilot channel transmits a signal at the constant transmission power level regardless of the forward data rate or the margin.

8. A method for determining a forward data rate and a forward transmission power level in a mobile communication system, comprising the steps of:
measuring, in an access terminal, a received C/I of a forward pilot channel and selecting a largest one of C/I thresholds that is smaller than the measured C/I, stored in a C/I table, as a reference C/I;

determining a forward data rate associated with the selected reference C/I;

determining a difference between the measured C/I and the reference C/I as margin information;

transmitting the determined forward data rate and margin information over a reverse transmission channel; and decreasing a transmission power level in an access network by power corresponding to the margin information and performing forward transmission at the forward data rate at the decreased transmission power level, upon receipt of the forward data rate and margin information;

wherein the step of transmitting the determined forward data rate and the margin information comprises the step of transmitting the data rate for one slot and the margin information for a next one slot over the reverse transmission channel.

9. The method as claimed in claim 8, wherein the step of determining the margin information comprises the step of calculating a difference between the reference C/I and the measured C/I and converting the calculated difference into a value comprised of a predetermined number of data bits.

10. The method as claimed in claim 8, wherein the forward data rate and the margin information are repeated once before transmission.

11. The method as claimed in claim 8, wherein the access terminal measures the C/I for 2 slots of the forward pilot channel.

12. The method as claimed in claim 8, wherein when the data rate and the margin information are received over two slots, the access network performs scheduling of the forward data rate and determination of the transmission power level in a unit of 2 slots.

13. A method for determining a forward data rate and a forward transmission power level in a mobile communication system, comprising the steps of:

measuring, in an access terminal, a received C/I of a forward pilot channel and selecting a largest one of C/I thresholds that is smaller than the measured C/I stored in a C/I table, as a reference C/I;

determining a forward data rate associated with the selected reference C/I;

determining a difference between the measured C/I and the reference C/I as margin information;

transmitting the determined forward data rate and margin information over a reverse transmission channel; and decreasing a transmission power level in an access network by power corresponding to the margin information and performing forward transmission at the forward data rate at the decreased transmission power level, upon receipt of the forward data rate and margin information, wherein the determined data rate and the margin information are transmitted for one slot over the reverse transmission channel.

14. The method as claimed in claim 8, wherein the access network transmits a signal on the forward pilot channel at a constant transmission power level regardless of the data rate or the margin.

15. A method for determining a forward data rate and a forward transmission power level in an access terminal of a mobile communication system, comprising the steps of:

measuring a received C/I of a forward pilot channel; and transmitting the measured C/I over a reverse data rate control (DRC) channel;

wherein the transmitted C/I is two times as long as a length of the DRC channel.

16. The method as claimed in claim 15, wherein the C/I is divided into leading bits and following bits as long as a length of the (DRC) channel, wherein the leading bits are first transmitted for one slot and then the following bits are transmitted for a next one slot.

17. The method as claimed in claim 15, wherein the transmitted C/I is transmitted for one slot of a data rate control channel, without repetition.

18. The method as claimed in claim 17, wherein the transmitted C/I is divided into leading bits and following bits, wherein the leading bits and the following bits are transmitted in the first half-slot and the second half-slot of the reverse DRC channel, respectively.

19. A method for determining a forward data rate and a forward transmission power level in an access network of a mobile communication system, comprising the steps of:

receiving a measured C/I over a reverse link and selecting a largest one of C/I thresholds that is smaller than the measured C/I, stored in a C/I table, as a reference C/I;

determining a forward data rate associated with the selected reference C/I;

determining margin information for determining the forward transmission power level by calculating a difference between the measured C/I and the reference C/I, when the measured C/I is not identical to the reference C/I;

creating data to be transmitted at the determined forward data rate;

decreasing the transmission power level using the calculated margin information; and transmitting the transmission data at the decreased transmission power level;

wherein when the C/I is received over 2 slots, scheduling of the data rate and the margin information is performed in a unit of 2 slots.

20. The method as claimed in claim 19, wherein a forward pilot channel transmits a signal at a constant transmission power level regardless of the forward data rate or the margin.

21. A method for determining a forward data rate and a forward transmission power level in a mobile communication system, comprising the steps of:

measuring, in an access terminal, a received C/I of the forward pilot channel;

transmitting the measured C/I over a reverse DRC channel and selecting a largest one of C/I thresholds that is smaller than the measured C/I, stored in a C/I table, as a reference C/I;

determining, in an access network, a forward data rate associated with the selected reference C/I;

determining margin information for determining the forward transmission power level by calculating a difference between the measured C/I and the reference C/I when the received C/I is not identical to the reference C/I;

creating transmission data associated with the determined data rate;

decreasing the transmission power level using the calculated margin information; and transmitting the transmission data at the decreased transmission power level;

wherein the C/I is two times as long as a length of the DRC.

22. The method as claimed in claim 21, wherein the C/I is divided into leading bits and following bits as long as a length of the data rate control (DRC), wherein the leading bits are first transmitted over one slot and the following bits are transmitted over a next one slot.

23. The method as claimed in clam 21, wherein the C/I is transmitted over one slot of the data rate control channel, without repetition.

24. The method as claimed in claim 23, wherein the C/I is divided into leading bits and following bits, wherein the leading bits and the following bits are transmitted in the first half-slot and the second half slot of the DRC channel, respectively.

25. The method as claimed in claim 21, wherein when the C/I is received over 2 slots, scheduling of the data rate and the margin information is performed in a unit of 2 slots.

26. The method as claimed in claim 21, wherein a forward pilot channel transmits its channel signal at a constant transmission power level regardless of the forward data rate and the margin.

27. A transmission apparatus for a mobile communication system, for determining a forward data rate using a C/I value measured from the pilot channel and transmitting the forward data rate and a transmission power level over a reverse transmission channel using margin information determined based on a difference between a reference C/I and the C/I, comprising:
 a first multiplexer for time-division-multiplexing the forward data rate and the margin information;
 an encoder for encoding an output of the first multiplexer;
 a spreader for spreading the encoded data rate and margin information;
 a second multiplexer for time-division-multiplexing a reverse pilot channel and an RRI (Reverse Rate Indicator) channel to an output of the spreader; and
 a repeater for repeating the output of the encoder and providing its output to the spreader when the forward data rate and the margin information are transmitted over 2 slots.

28. The transmission apparatus as claimed in claim 27, wherein the first multiplexer alternately outputs the forward data rate and the margin information in a unit of one slot.

29. A transmission apparatus for transmitting a C/I in a mobile communication system, comprising:
 an encoder for encoding a measured C/I;
 a spreader for spreading an output of the encoder; and
 a first multiplexer for time-division-multiplexing an output of the spreader, a reverse pilot channel and an RRI channel;
 wherein the received C/I is outputted in a unit of one slot when the received C/I is transmitted in a unit of one slot, dividing the C/I into leading bits and following bits.

30. The transmission apparatus as claimed in claim 29, further comprising:
 a second multiplexer arranged at a front stage of the encoder, for equally dividing the C/I into leading bits and following bits when the C/I is transmitted in a unit of 2 slots, outputting the leading bits at a first slot and outputting the following bits at a next slot; and
 a repeater interposed between the encoder and the spreader, for repeating an output of the encoder.

\* \* \* \* \*